United States Patent Office 3,417,089
Patented Dec. 17, 1968

3,417,089
ENOL BETAINES AND PROCESS FOR PREPARING THE SAME
Frederic Houghton Megson, Bridgewater Township, Somerset County, Michael Thomas Beachem, Franklin Township, Somerset County, and Richard Frederick Stockel, Bridgewater Township, Somerset County, N.J., assignors to American Cyanamid Company, Stamford, Conn., a corporation of Maine
No Drawing. Filed July 16, 1964, Ser. No. 383,210
11 Claims. (Cl. 260—286)

ABSTRACT OF THE DISCLOSURE

This invention relates to a new class of enol betaines and more particularly to enol betaines of 1-halo-2(linear) alkoxyhexafluoro-1-cyclopentene and their process of preparation. The enol betaines are useful as ultraviolet light absorbers and brighteners and have antifungal properties.

---

This invention relates to a novel class of compounds and in particular to a novel class of enol betaines.

More particularly, this invention relates to enol betaines selected from the group consisting of

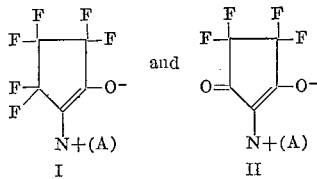

wherein N+(A) is the residue of a heterocyclic base and more particularly is pyridinium, 3-carbamoylpyridinium or isoquinolinium.

The enol betaines of Formula I above are preferably prepared by reacting a 1-chloro-2-(linear)alkoxyhexafluoro-1-cyclopentene of the formula

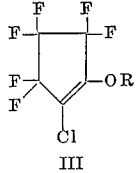

wherein R is a linear alkyl group containing from 1 to 16 carbon atoms, with a suitable heterocyclic base in a suitable solvent medium.

Suitable heterocyclic bases are pyridine and isoquinoline and those derivatives of pyridine and isoquinoline which are sufficiently basic (i.e., those which have a $pK_a$ above 3.0) to react and which do not contain on the carbon atom adjoining the hetero atom a substituent of sufficient bulk to prevent reaction because of steric hindrance. Examples of suitable heterocycle bases are 3- and 4-carbamoylpyridine, 3- and 4-phenylpyridine, 2-, 3- and 4-methoxypyridine, 2-, 3- and 4-aminopyridine, 3- and 4-bromopyridine, 3- and 4-acetopyridine, 4-carbamoylisoquinoline, 4-phenylisoquinoline, 4-methoxyisoquinoline, 4-aminoisoquinoline, 4-bromoisoquinoline, and derivatives of isoquinoline with substituents on the 5, 6, 7 and 8-positions.

The preferred starting material contemplated by the structural Formula III above is 1-chloro-2-methoxy-3,3,4,4,5,5-hexafluoro-1-cyclopentene, which may be obtained by the procedures outlined in the J. Indian Chem. Soc., 30, 809 (1953).

In carrying out the reaction between 1-chloro-2-(linear)alkoxyhexafluoro-1-cyclopentene and the heterocyclic bases contemplated by this invention, it should preferably be conducted in a solvent medium. Where the heterocyclic base is a liquid at the reaction temperature employed, such as pyridine or isoquinoline, an excess of the base can be employed as the solvent medium or an inert solvent may be used. Where the base is a solid, as in the case of nicotinamide, an inert solvent should be employed.

Suitable inert solvents include ethyl acetate, acetonitrile, acetone, ethyl ether, nitromethane, diglyme, tetrahydrofuran, dimethylsulfoxide, dimethylformamide, tetramethylurea, N-methylpyrrolidinone, and the like.

In carrying out the process, at least 2 moles of the heterocyclic base should be employed per mole of the 1-chloro-2-(linear)alkoxyhexafluoro-1-cyclopentene, although larger amounts may be used if not uneconomical.

The reaction may be carried out at atmospheric, subatmospheric or superatmospheric pressures. At atmospheric pressures, temperatures of from about 20° to 150° C. may be employed as limited by the boiling point of the solvent medium.

The reaction is usually, but not necessarily, carried out to completion. The time of reaction depends upon the reactants, temperature and such variables, and may be continued until assay of ionic chlorine indicates that the reaction is essentially complete or more conveniently until the characteristic absorption bands of the 1-chloro-2-alkoxyhexafluoro-1-cyclopentene are no longer detected in the infrared spectrum of the liquid phase.

In the case of the product of Formula I above, when the reaction is run in a suitable solvent, it may be isolated by conventional means, for example, by filtration or centrifuging, preferably in a dry atmosphere to prevent hydrolysis of the product, to remove the alkylammonium halide coproduct, then by removal of the solvent by vacuum distillation.

To obtain the product of Formula II above, the product of Formula I is hydrolyzed at a pH of from 1 to 14 and preferably at from 2 to 11, either by treating the isolated product with water or by pouring a reaction mixture containing a product of Formula I directly into water. Preferably, but not necessarily, hydrolysis is accomplished in the presence of trace amounts of mineral acid. Where the excess amine is not soluble in water, but is soluble in dilute acid, an amount of acid sufficient to dissolve the amine may be used. Where the amine is soluble in water and an insufficient excess is present to neutralize the hydrogen fluoride liberated by the hydrolysis reaction, it may be desirable to hydrolyze in the presence of a suitable inorganic base such as a metal carbonate or metal hydroxide to neutralize the acid. The final products may then be isolated by conventional means as, for example, by filtration or centrifuging.

In addition to the above outlined procedures, the enol betaines of Formulae I and II above may be obtained by reacting 1,2-dichlorohexafluoro-1-cyclopentene, a compound of the formula

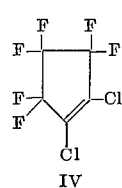

with a suitable heterocyclic base within the meaning of this invention in the presence of a linear alcohol and a heterocyclic nitrogen compound, such as pyridine, isonicotinamide and isoquinoline, to produce in situ the compound of Formula I above, which may then be hydrolized to give the product of Formula II.

The enol betaines of this invention are stable, high melting, colorless to bright yellow, crystalline solids fluorescing light blue in ultraviolet light.

These novel betaines are useful as ultraviolet light absorbers and brighteners and have antifungal properties, particularly towards the species *Trichophyton mentagraphytes*.

The following examples are given primarily by way of illustration. No specific details or enumerations contained therein should be construed as limitations on the present invention except insofar as they appear in the appended claims. All parts and percentages are by weight unless otherwise specifically designated.

EXAMPLE 1

1-(2-hydroxy-3,3,4,4,5,5-hexafluoro-1-cyclopenten-1-yl)-pyridinum hydroxide, inner salt

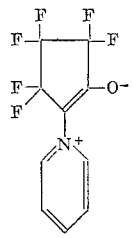

A solution of 1-chloro-2-methoxyhexafluoro-1-cyclopentene (24.1 g., 0.10 mole) and pyridine (16.6 g., 0.21 mole) in bis(2-methoxyethyl) ether, i.e., diglyme, (25 g.) was stirred 8 days at 25–30° in a closed flask. The resulting yellow-brown slurry was filtered and the cake, washed once with diglyme and twice with ethyl ether and vacuum dried, gave a light tan solid (10.6 g., 82% of theory) identified as 1-methylpyridinium chloride.

The combined filtrate and washes, after evaporation to constant weight at 50° C. at less than 5 mm. of mercury pressure, gave a brown crystalline solid (38.1 g.) of 1-(2 - hydroxyhexafluoro-1-cyclopenten-1-yl-pyridinium hydroxide, inner salt, containing diglyme of crystallization.

Recrystallization from benzene-petroleum ether gave the desired compound itself as light tan crystals.

Calculated for $C_{10}H_5F_6NO$: N, 5.21; F, 42.4. Found: N, 5.49; F, 42.7.

EXAMPLE 2

1-(2-hydroxy-3,3,4,4-tetrafluoro-5-oxo-1-cyclopenten-1-yl) pyridinium hydroxide, inner salt

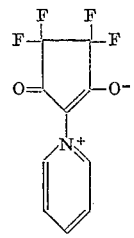

A solution of 1-chloro-2-methoxy-hexafluoro-1-cyclopentene (24.1 g., 0.10 mole) in anhydrous pyridine (39.6 g., 0.50 mole) was stirred at 20–25° C. in a stoppered flask for 5 days. The solution was concentrated in vacuo at a temperature below 50° C., and the solid residue (37.2 g.) was triturated with ethyl ether. This intermediate product (10.0 g.), when triturated with water (40 g.), allowed to stand overnight, filtered, washed and dried, gave a light tan solid (6.0 g., 97% of theory) melting at 231–233° C.; recrystallized from ethanol, melting point 233–234° C.

Calculated for $C_{10}H_5F_4NO_2$: C, 48.6; H, 2.04; F, 30.7; N, 5.67; molecular weight, 247.2. Found: C, 48.4; H, 2.12; F, 31.2; N, 5.63; molecular weight 241.1.

The intermediate product was an equimolar mixture of 1-(2-hydroxy - 3,3,4,4,5,5 - hexafluoro-1-cyclopenten-1-yl)-pyridinium hydroxide inner salt and 1-methylpyridinium chloride. (See Examples 1 and 3).

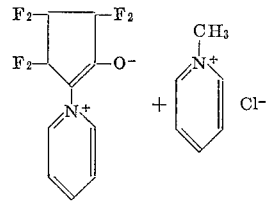

EXAMPLE 3

1-(2-hydroxy-3,3,4,4-tetrafluoro-5-oxo-1-cyclopenten-1-yl)-pyridinium hydroxide, inner salt

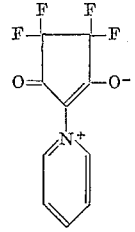

A solution of 1-chloro-2-methoxy-hexafluoro-1-cyclopentene (24.1 g., 0.10 mole) and pyridine (16.6 g., 0.21 mole) in bis(2-methoxyethyl)ether, i.e., diglyme, (100 g.) was stirred for 7 days at 25–30° C. The resulting yellow-brown slurry, filtered and the cake washed with small portions of diglyme, then with ethyl ether and vacuum dried, gave a nearly colorless, water-soluble solid (7.0 g., 54% of theory) identified as methylpyridinium chloride.

The combined filtrate and washes, poured into 500 g. of water at 25–30° C., gave an immediate precipitate of glistening crystals. Filtering, washing with water and drying gave red-brown crystals (17.5 g., 71% of theory) having the same infrared curve as the product from Example 2.

EXAMPLE 4

1-(2-hydroxy-3,3,4,4,5,5-hexafluoro-1-cyclopenten-1-yl)-isoquinolinium hydroxide, inner salt

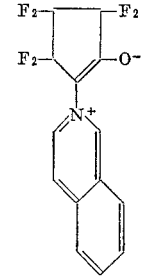

A solution of 1-chloro-2-methoxy-hexafluoro-1-cyclopentene (24.1 g., 0.10 mole) in isoquinoline (64.6 g., 0.50 mole) was allowed to stand 48 hours at 20–25° C. The reaction mass was broken up under anhydrous ethyl ether, triturated thoroughly, filtered and washed three times with ether. Drying in vacuo gave a light olive-yellow solid (47.1 g., 94%), melting point 156–160° C. (decomposition).

EXAMPLE 5

1-(2-hydroxy-3,3,4,4-tetrafluoro-5-oxo-1-cyclopenten-1-yl-isoquinolinium hydroxide, inner salt

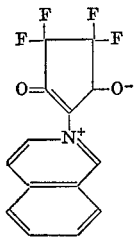

The product of Example 4, triturated thoroughly with water containing a few drops of concentrated hydrochloric acid, washed with water and dried, gave a light olive-yellow solid (11.9 g., 100% of theory). Recrystallization from ethanol gave golden yellow crystals, melting at 248–249° C.

*Analysis.*—Calculated for $C_{14}H_7F_4NO_2$: F, 25.6; N, 4.72. Found: F, 24.1; N, 4.69.

EXAMPLE 6

3-carbamoyl-1-(2-hydroxy-3,3,4,4-tetrafluoro-5-oxo-1-cyclopenten-1-yl)pyridinium hydroxide, inner salt

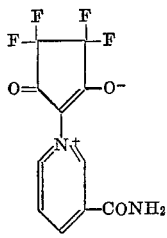

A solution of nicotinamide (48.0 g., 0.40 mole) and 1-chloro-2-methoxyhexafluoro-1-cyclopentene (48.1 g., 0.20 mole) in ethyl acetate (550 g.) was refluxed 22 hours at 80–82° C. The mixture was filtered hot to remove 21.0 g. of water-soluble light tan crystalline solid. The filtrate, stripped of solvent, left a solid residue which, washed with water, gave a light brownish-yellow solid (19.4 g., 34% of theory) melting at 180–215° C. Recrystallized from alcohol, the pale yellow crystals melted at 227–229° C.

*Analysis.*—Calculated for $C_{11}H_6F_4N_2O_3$: C, 45.4; H, 2.09; F, 26.2; N, 9.66. Found: C, 45.4; H, 2.34; F, 25.7; N, 9.79.

EXAMPLE 7

1-(2-hydroxy-3,3,4,4-tetrafluoro-5-oxo-1-cyclopenten-1-yl)-pyridinium hydroxide, inner salt

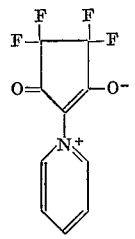

To a solution of 1,2-dichlorohexafluoro-1-cyclopentene (141 g., 0.58 mm.) in pyridine (100 g.) was added a solution of 2-hydroxyethyl methacrylate (50.0 g., 0.38 mm.) in pyridine (350 g.) containing the inhibitor di-beta-naphthol (4.5 g.) over 1 hour at 25–30° C. The reaction mixture was heated to 50° over 1 hour, held 2 hours at 50–55° C., then allowed to cool to ambient temperature. Pouring into dilute HCl-ice water mixture and decanting the aqueous phase left a purple-brown granular solid (15.5 g., 13% of theory) which on recrystallization from acetone gave 1-(2-hydroxy-3,3,4,4-tetrafluoro-5-oxo-1-cyclopenten-1-yl)pyridinium hydroxide, inner salt.

We claim:
1. Compounds selected from the group consisting of

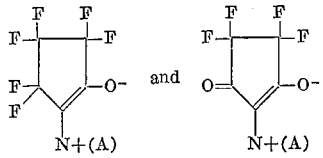

where N+(A) is selected from the group consisting of pyridinium, 3- or 4-carbamoyl, phenyl, lower alkoxy, amino, bromo and aceto substituted pyridiniums, isoquinolinium, and 4-, 5-, 6-, 7- or 8-carbamoyl, phenyl, lower alkoxy, amino, bromo and aceto substituted isoquinoliniums.

2. 1-(2-hydroxy-3,3,4,4,5,5-hexafluoro-1-cyclopenten-1-yl)pyridinium hydroxide, inner salt.

3. 1-(2-hydroxy-3,3,4,4-tetrafluoro-5-oxo-1-cyclopenten-1-yl)isoquinolinium hydroxide, inner salt.

4. 3-carbamoyl-1-(2-hydroxy-3,3,4,4-tetrafluoro-5-oxo-1-cyclopenten-1-yl)pyridinium hydroxide, inner salt.

5. 1-(2-hydroxy-3,3,4,4,5,5-hexafluoro-1-cyclopenten-1-yl)isoquinolinium hydroxide, inner salt.

6. A process for preparing compounds of the formula

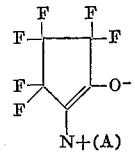

where N+(A) is selected from the group consisting of pyridinium, 3-carbamoylpyridinium and isoquinolinium, which comprises reacting 1-chloro-2-(linear)alkoxy-hexafluoro-1-cyclopentene with a heterocyclic base selected from the group consisting of pyridine, 3-carbamoylpyridine, and isoquinoline.

7. A process for preparing compounds of the formula

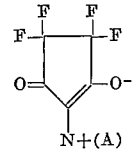

where N+(A) is selected from the group consisting of pyridinium, 3-carbamoylpyridinium and isoquinolinium, which comprises reacting 1-chloro-2-(linear)alkoxy-hexafluoro-1-cyclopentene with a heterocyclic base selected from the group consisting of pyridine, 3-carbamoylpyridine, and isoquinoline to form an intermediate product, and reacting said intermediate product with water.

8. A process for preparing compounds of the formula

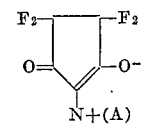

where N+(A) is selected from the group consisting of pyridinium, 3-carbamoylpyridinium and isoquinolinium, which comprises reacting 1,2-dichlorohexafluoro-1-cyclopentene with a heterocyclic base selected from the group consisting of pyridine, 3-carbamoylpyridine, and isoquinoline in the presence of a linear alcohol to form an intermediate product, and reacting said intermediate with water.

9. A compound of the formula

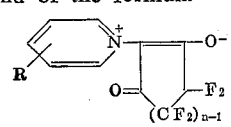

wherein R is selected from the group consisting of

COOR′, Br, and H; R′ is alkyl and $n$ is an integer from 1 to 3.

10. (3,3,4,4-tetrafluoro - 2,5-dioxocyclopentyl)-pyridinium betaine.

11. (3,3,4,4 - tetrafluoro - 2,5 - dioxocyclopentyl)-3-bromo-pyridinium betaine.

References Cited

UNITED STATES PATENTS

| | | | |
|---|---|---|---|
| 3,129,225 | 4/1964 | Shapiro et al. | 260—287 |
| 3,244,749 | 4/1966 | Weil | 260—563 |
| 3,285,926 | 11/1966 | Ellzey et al. | 260—295 |

NICHOLAS S. RIZZO, *Primary Examiner.*

D. DAUS, *Assistant Examiner.*

U.S. Cl. X.R.

260—295, 287, 297, 296, 288, 283, 289, 207; 167—33, 65; 260—611; 252—301.2